(12) United States Patent
Wang

(10) Patent No.: US 7,815,765 B2
(45) Date of Patent: Oct. 19, 2010

(54) METHOD FOR FORMING LAMINATED SYNTHETIC LEATHER

(76) Inventor: Swei Mu Wang, No. 208-20, Jhongcing Rd., Situn District, Taichung City 40761 (TW)

( * ) Notice: Subject to any disclaimer, the term of this patent is extended or adjusted under 35 U.S.C. 154(b) by 353 days.

(21) Appl. No.: 12/068,876

(22) Filed: Feb. 13, 2008

(65) Prior Publication Data

US 2008/0135164 A1  Jun. 12, 2008

Related U.S. Application Data

(63) Continuation-in-part of application No. 10/817,277, filed on Apr. 1, 2004, now abandoned.

(51) Int. Cl.
*B29C 47/02* (2006.01)
(52) U.S. Cl. .............. 156/244.24; 156/244.26
(58) Field of Classification Search ........... None
See application file for complete search history.

(56) References Cited

U.S. PATENT DOCUMENTS

| 3,058,863 | A | * | 10/1962 | Gaines et al. | ....... 428/114 |
| 3,075,864 | A | * | 1/1963 | Anderson | ....... 428/335 |
| 2005/0224165 | A1 | * | 10/2005 | Wang | ....... 156/244.27 |

* cited by examiner

*Primary Examiner*—Richard Crispino
*Assistant Examiner*—Barbara J. Musser
(74) *Attorney, Agent, or Firm*—Banger Shia

(57) ABSTRACT

A method for forming a laminated synthetic leather includes engaging a textile carrier onto a carrying roll, extruding one or more materials with an extruder machine into a film, and feeding the film downwardly onto a lamination roll to have the film carried on a portion of an outer peripheral portion of the lamination roll and to have the film to be suitably cooled by the lamination roll. The film and the textile carrier are then compressed together with the rolls, to form the laminated synthetic leather, and to prevent the film from penetrating into the textile carrier to a greater extent, and to form a soft or flexible laminated synthetic leather.

9 Claims, 4 Drawing Sheets

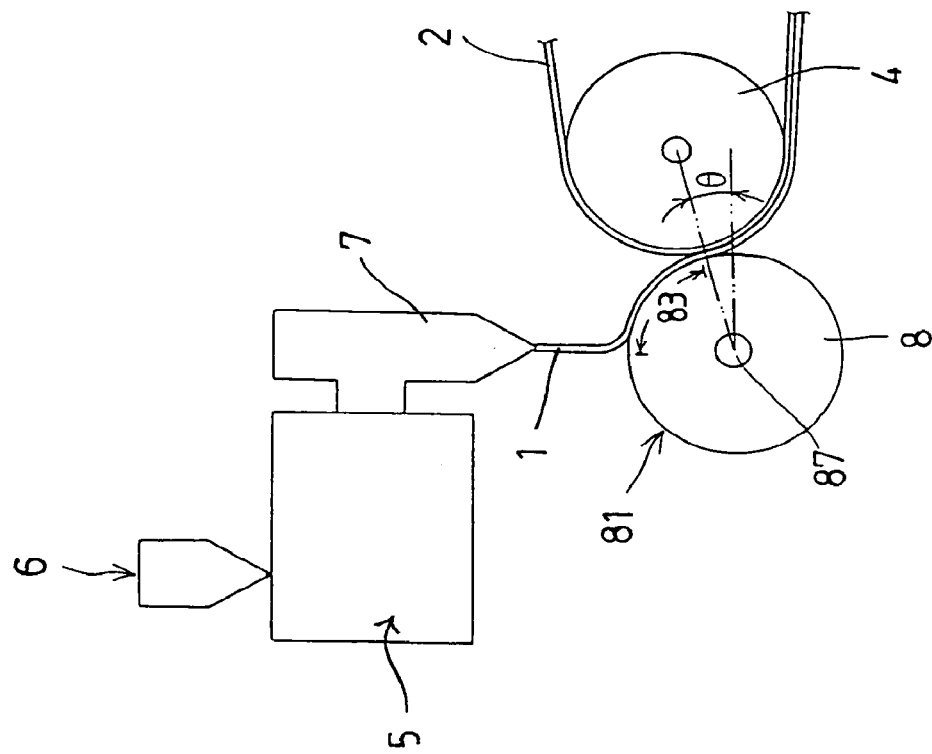
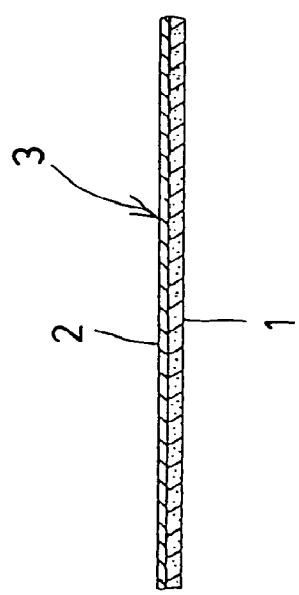
FIG. 4
FIG. 3

METHOD FOR FORMING LAMINATED SYNTHETIC LEATHER

This application is a Continuation-in-Part of U.S. patent application Ser. No. 10/817,277 filed Apr. 1, 2004, now abandoned to which application priority is claimed.

BACKGROUND OF THE INVENTION

1. Field of the Invention

The present invention relates to a method, and more particularly to a method for manufacturing or forming laminated synthetic leather.

2. Description of the Prior Arts

Typically, for manufacturing or forming laminated synthetic leathers, a soft or melted coating is heated or melted or extruded from an extruder machine into a film, and then pressed onto a textile carrier with rolls, in order to solidly secure the film of the soft or melted coating onto the textile carrier.

For example, German Patent No. DD 298578-A7 to Braun et al. discloses one of the typical extrusion-coating method for pressing a coating of soft polyvinyl chloride (PVC) onto a textile carrier with two rolls. The textile carrier is viscose and heated by contact with a heated lamination roll.

For allowing the soft PVC coating or film to be solidly attached or secured onto the textile carrier, in the compression region between the film of the soft or melted coating and the textile carrier, the PVC film is not initially cooled so much that it loses its thermoplastic workability, and the textile carrier is heated so that the PVC film applied penetrates into the textile carrier to a greater extent.

However, on subsequent cooling, the PVC film loses its workability and flexibility, such that a great portion of the textile carrier will also lose its workability and flexibility, and such that the users may not feel soft or flexible or comfortable when wearing a cloth manufactured with such laminated synthetic leathers.

The present invention has arisen to mitigate and/or obviate the afore-described disadvantages of the conventional methods for manufacturing or forming laminated synthetic leathers.

SUMMARY OF THE INVENTION

The primary objective of the present invention is to provide a method for manufacturing or forming laminated synthetic leather and for preventing the soft film or coating from penetrating into the textile carrier to a greater extent, and thus for forming a soft or flexible laminated synthetic leather.

In accordance with one aspect of the invention, there is provided a method for manufacturing or forming a laminated synthetic leather, the method comprising providing a carrying roll, engaging a textile carrier onto the carrying roll, providing and disposing a lamination roll close to the carrying roll, providing an extruder machine to extrude a material into a film, downwardly feeding the film onto the lamination roll, to have the film carried on a roll segment of an outer peripheral portion of the lamination roll, and to have the film to be suitably cooled by the lamination roll, the roll segment having two ends, a first end disposed where the film begins to contact with the lamination roll at substantially 89 degrees with respect to the above horizontal plane that the angle is measured through the lamination roll axis relative to the above horizontal plane passing through the point where the lamination roll and carrying roll meet, the second end disposed where the film leaves the lamination roll at approximately 1 degree measured through the lamination roll axis relative to the above horizontal plane, whereby the film contacts the lamination roll over a sufficient segment of the lamination roll to provide a substantially constant thickness of the film, providing a passage in the lamination roll, feeding a cooling fluid through the passage of the lamination roll to cool the lamination roll and to cool the film when the film is carried on the segment of the outer peripheral portion of the lamination roll, compressing the film and the textile carrier together with the carrying roll and the lamination roll, to form the laminated synthetic leather, and to prevent the film from being completely penetrated into the textile carrier, wherein the above horizontal plane is horizontal to the ground and the point of contact of the lamination roll and carrying roll is a line, not a plane, the roll segment is the entire surface of the lamination roll that the film contacts.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a cross sectional view showing a laminated synthetic leather to be made with the method for manufacturing or forming laminated synthetic leather in accordance with the present invention;

FIG. 4 is a plan schematic view similar to FIG. 1, illustrating the other arrangement for conduction the method for manufacturing or forming laminated synthetic leather;

DETAILED DESCRIPTION OF THE PREFERRED EMBODIMENT

Figure 2:
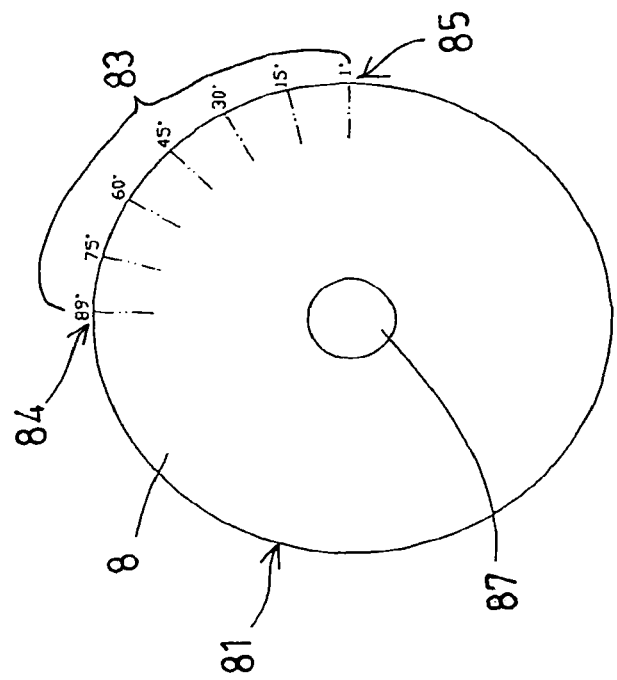
FIG. 2 is a plan schematic view illustrating a lamination roll for carrying and cooling a soft film or coating before compression.
Figure 1:
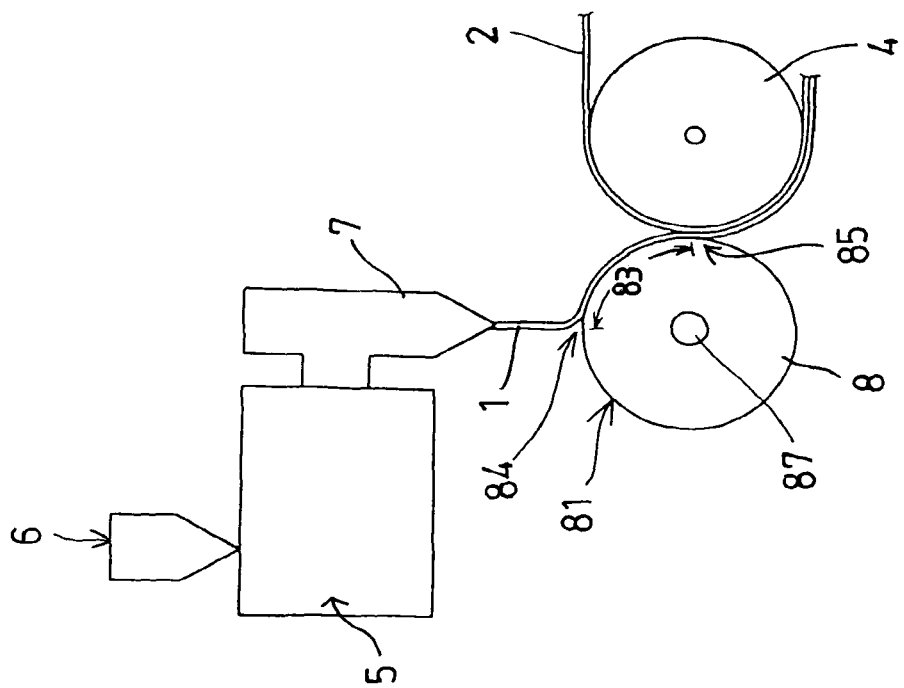
FIG. 1 is a plan schematic view illustrating a method for manufacturing or forming laminated synthetic leather in accordance with the present invention.

Referring to the drawings, and initially to FIGS. 1-3, a method in accordance with the present invention is provided for attaching or compressing a soft film or coating 1 and a textile carrier 2 together, to form a laminated synthetic leather 3 (FIG. 3), and to prevent the soft film or coating 1 from penetrating into the textile carrier 2 to a greater extent, and thus for forming a soft or flexible laminated synthetic leather 3. A carrying roll 4 is provided to carry the textile carrier 2, and may be made of metal, plastic, rubber or other materials.

An extruder machine 5 is provided to form the soft film or coating 1, and includes an inlet 6 for receiving the materials for forming the soft film or coating 1, and includes a port 7 for outlet the materials that have been heated or melted by the extruder machine 5, to form the soft film or coating 1.

For example, the materials for forming the soft film or coating 1 may be selected from thermoplastic polymers, such as thermoplastic urethane (TPU)+styrene butadiene rubber (SBR); thermoplastic urethane (TPU)+styrene ethylene butylenes styrene block copolymer (SEBS); thermoplastic urethane (TPU)+thermoplastic rubber (TPR); thermoplastic urethane (TPU)+ethylene propylene diene monomer rubber (EPDM); or the like.

The inclusion or the introducing of the other materials, such as styrene butadiene rubber (SBR), styrene ethylene butylenes styrene block copolymer (SEBS), thermoplastic rubber (TPR), ethylene propylene diene monomer rubber (EPDM) into the thermoplastic urethane (TPU) is provided to change the characteristics of the thermoplastic urethane (TPU), in order to form the soft film or coating 1 having a porous structure or having a number of perforations formed therein. A foamable agent may further be added or introduced into the materials for forming the soft film or coating 1, in order to increase the softness or the flexibility of the film or coating 1.

A lamination roll 8 is further provided and disposed close to the carrying roll 4, and includes an outer peripheral portion 81 to support and to carry the soft film or coating 1, and is preferably made of heat conductive materials, such as metal, for contacting with the heated or melted soft film or coating 1. A roll segment 83 of the outer peripheral portion 81 of the lamination roll 8 is contacted with the heated or melted soft film or coating 1, and has two ends, a first end disposed where the film begins to contact with the lamination roll 8 at substantially 89 degrees with respect to the above horizontal plane that the angle is measured through the lamination roll axis relative to the above horizontal plane passing through the point where the lamination roll 8 and carrying roll 4 meet, the second end disposed where the film leaves the lamination roll 8 at approximately 1 degree measured through the lamination roll axis relative to the above horizontal plane, whereby the film contacts the lamination roll 8 over a sufficient segment of the lamination roll 8 to provide a substantially constant thickness of the film, wherein the above horizontal plane is horizontal to the ground and the point of contact of the lamination roll and carrying roll is a line, not a plane, and the roll segment is the entire surface of the lamination roll that the film contacts.

For example, as shown in FIGS. 1 and 2, it is preferably that the heated or melted soft film or coating 1 is flowing or feeding downwardly out of or from the port 7 of the extruder machine 5, to engage with a top point or an end 84 of the segment 83 that is designed with 89.degree. of the lamination roll 8, and engaged with the segment 83 of the outer peripheral portion 81 of the lamination roll 8, and then leaving at a lateral point or another end 85 of the segment 83 that is designed with 1.degree. of the lamination roll 8. Accordingly, the lamination roll 8 is preferably controlled and limited to rotate within a rotational or moving stroke of about 89 degrees.

In addition to suitably cooling the heated or melted soft film or coating 1, the lamination roll 8 may also be used to suitably support the heated or melted soft film or coating 1, to allow the heated or melted soft film or coating 1 to have a uniformly distributed thickness, or to prevent the heated or melted soft film or coating 1 from having a changing thickness.

The lamination roll 8 preferably includes a passage 87 formed or provided therein for receiving cooling water or fluid therethrough, and for allowing the lamination roll 8 and thus the heated or melted soft film or coating 1 to be suitably cooled by the cooling water or fluid flowing through the passage 87 of the lamination roll 8.

It is to be noted that the flowing speed of the cooling water or fluid flowing through the passage 87 of the lamination roll 8 may be controlled to determine the temperature of the heated or melted soft film or coating 1, for allowing the heated or melted soft film or coating 1 to be suitably pressed onto the textile carrier 2. The rotational speed of the lamination roll 8 may also be controlled to change the supporting time of the film 1 on the roll 8 and to determine the temperature of the heated or melted soft film or coating 1.

Figure 5:
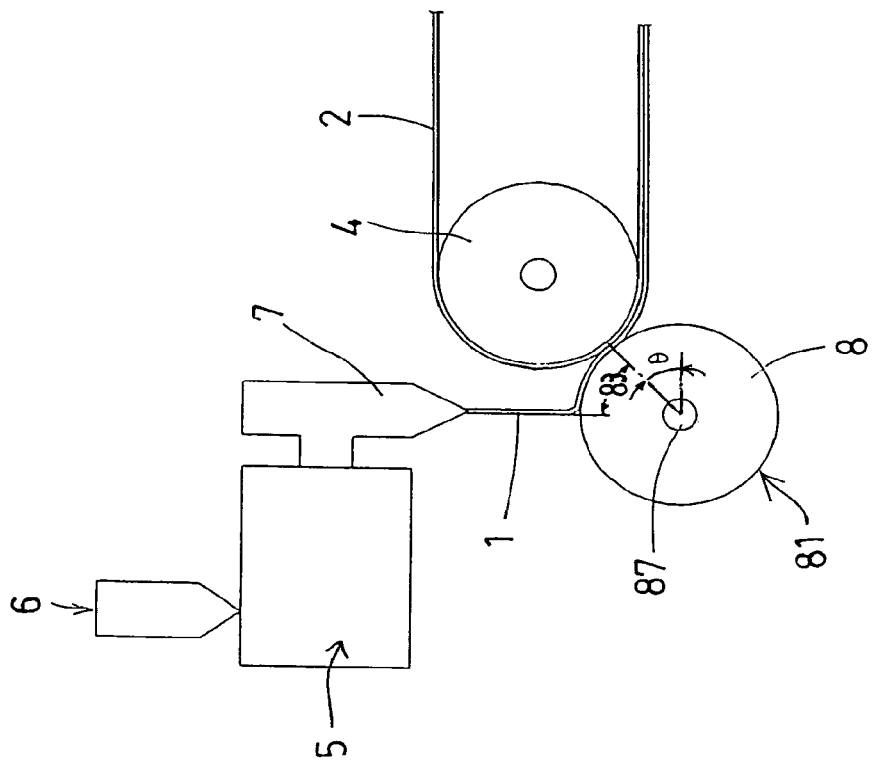
FIG. 5 is a plan schematic view similar to FIGS. 1 and 4, illustrating another arrangement for conduction the method for manufacturing or forming laminated synthetic leather.

As shown in FIG. 1, the rolls 4, 8 may be disposed side by side, to allow the heated or melted soft film or coating 1 to be carried on all of the segment 83 of the outer peripheral portion 81 of the lamination roll 8. Alternatively, as shown in FIGS. 4 and 5, the carrying roll 4 may also be disposed or arranged in different angular position relative to the lamination roll 8, to change the engaging portion of the heated or melted soft film or coating 1 with the segment 83 of the outer peripheral portion 81 of the lamination roll 8.

Figure 6:
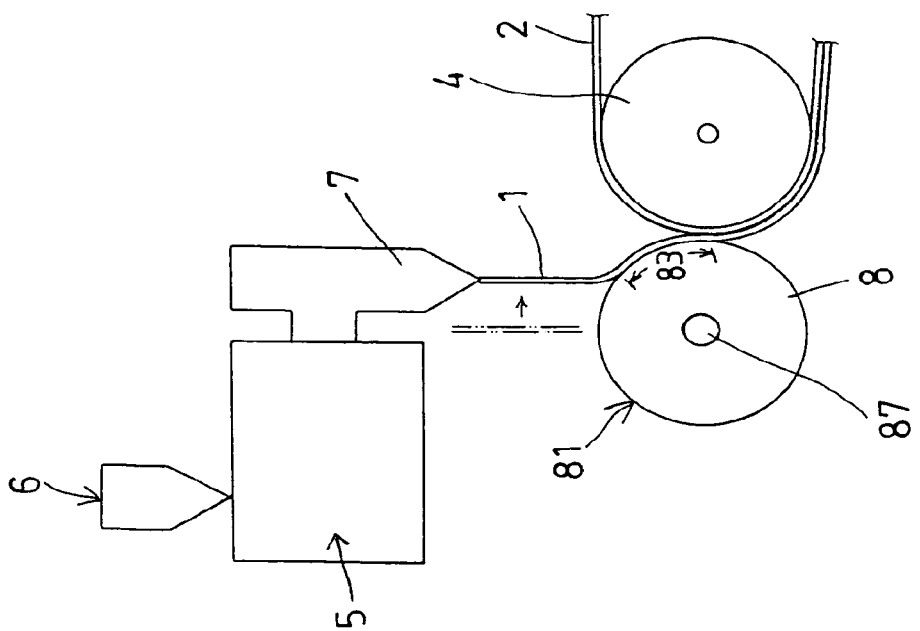
FIG. 6 is a plan schematic view similar to FIGS. 1 and 4-5, illustrating a further arrangement for conduction the method for manufacturing or forming laminated synthetic leather.
Figure 7:
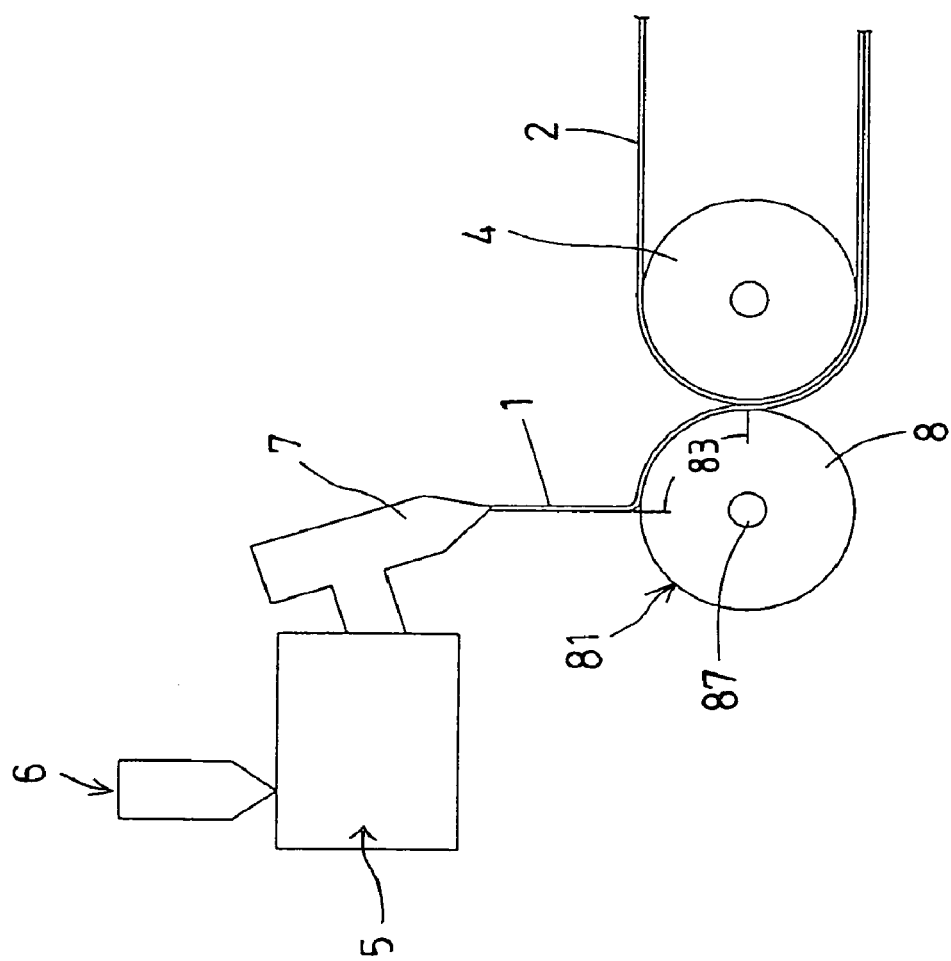
FIG. 7 is a plan schematic view similar to FIGS. 1 and 4-6, illustrating a still further arrangement for conduction the method for manufacturing or forming laminated synthetic leather.

Further alternatively, as shown in FIG. 6, the port 7 of the extruder machine 5 may also be changed to different position relative to the lamination roll 8, to change the engaging portion of the downwardly fed film or coating 1 with the segment 83 of the outer peripheral portion 81 of the lamination roll 8. As shown in FIG. 7, the port 7 of the extruder machine 5 may also be changed to different angular position relative to the lamination roll 8, to suitably supply the film or coating 1 toward the lamination roll 8.

After the heated or melted soft film or coating 1 has been suitably cooled to the required temperature by the lamination roll 8 and/or the cooling water or fluid, the film 1 and the textile carrier 2 may be compressed together by the rolls 4, 8, in order to form the laminated synthetic leather 3 (FIG. 3). In addition, the suitably cooled film 1 may be prevented from completely or fully penetrated into the textile carrier 2 to a greater extent.

For example, the film 1 may be penetrated into the textile carrier 2 to an extent of about 3-45 vol. %, for allowing the laminated synthetic leather 3 to have a suitable softness or flexibility. The outer peripheral portion 81 of the lamination roll 8 may be formed into a smooth outer surface or may be formed or knurled with various patterns to have the patterns to be transferred or formed on the laminated synthetic leather 3.

Accordingly, the method in accordance with the present invention may be used for preventing the soft film or coating from penetrating into the textile carrier to a greater extent, and thus for forming a soft or flexible laminated synthetic leather.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A method for manufacturing or forming a laminated synthetic leather, said method comprising:
   providing a carrying roll,
   engaging a textile carrier onto said carrying roll,
   providing and disposing a lamination roll close to said carrying roll,
   providing an extruder machine to extrude a material into a film, downwardly feeding said film onto said lamination roll, to have said film carried on a roll segment of an outer peripheral portion of said lamination roll, and to have said film to be suitably cooled by said lamination roll, said roll segment having two ends, a first end disposed where the film begins to contact with the lamination roll at 89 degrees above the horizontal plane measured through the plane where the carrying roll and the lamination roll contact intersecting at the lamination roll axis, a second end disposed where the film leaves the lamination roll at 1 degree above the horizontal plane measured through the plane where the carrying roll and the lamination roll contact intersecting at the lamination roll axis, whereby said film contacts said lamination roll over a sufficient segment of the lamination roll to provide a substantially constant thickness of said film, providing a passage in said lamination roll, feeding a cooling fluid through said passage of said lamination roll to cool said lamination roll and to cool said film when said film is carried on said segment of said outer peripheral portion of said lamination roll, compressing said film and said textile carrier together with said carrying roll and said lamination roll, to form said laminated synthetic leather, and to prevent said film from being completely penetrated into said textile carrier, wherein the horizontal plane is horizontal to the ground and the point of contact of said lamination roll and carrying roll is a line, not a plane, said roll segment is the entire surface of said lamination roll that the film contacts.

2. The method as claimed in claim 1 further comprising changing a rotational speed of said lamination roll, to change a supporting time of said film on said lamination roll.

3. The method as claimed in claim 1 further comprising introducing a foamable agent into said material for forming said film, and for increasing a softness of said film.

4. The method as claimed in claim 1 further comprising forming said film into a porous structure having a plurality of perforations formed therein.

5. The method as claimed in claim 1, wherein said material is selected from thermoplastic polymers.

6. The method as claimed in claim 5, wherein said thermoplastic polymers are a mixture of thermoplastic urethane (TPU)+styrene butadiene rubber (SBR).

7. The method as claimed in claim 5, wherein said thermoplastic polymers are a mixture of thermoplastic urethane (TPU)+styrene ethylene butylenes styrene block copolymer (SEBS).

8. The method as claimed in claim 5, wherein said thermoplastic polymers are a mixture of thermoplastic urethane (TPU)+thermoplastic rubber (TPR).

9. The method as claimed in claim 5, wherein said thermoplastic polymers are a mixture of thermoplastic urethane (TPU)+ethylene propylene diene monomer rubber (EPDM).

* * * * *